United States Patent [19]
Huether

[11] Patent Number: 5,816,053
[45] Date of Patent: Oct. 6, 1998

[54] APPARATUS AND METHODS FOR COOLING AND TEMPERING PROCESSED FOOD PRODUCTS

[75] Inventor: Larry A. Huether, Mandan, N. Dak.

[73] Assignee: Cloverdale Foods Company, Mandan, N. Dak.

[21] Appl. No.: 855,708

[22] Filed: May 8, 1997

[51] Int. Cl.$^6$ .............................. F25D 13/04; F25D 17/04
[52] U.S. Cl. ................................. 62/65; 62/186; 62/231; 236/78 B
[58] Field of Search ................................. 62/62, 65, 177, 62/180, 186, 190, 231, 93; 276/78 B

[56] References Cited

U.S. PATENT DOCUMENTS

| | | | |
|---|---|---|---|
| 4,474,026 | 10/1984 | Mochizuki et al. | 62/157 |
| 4,493,191 | 1/1985 | Hanson | 62/126 |
| 4,615,176 | 10/1986 | Tippmann | 62/62 |
| 4,697,429 | 10/1987 | Chandler et al. | 62/203 |
| 4,736,592 | 4/1988 | Ohling | 62/62 |
| 4,790,144 | 12/1988 | Yokouchi et al. | 62/156 |
| 4,858,443 | 8/1989 | Denpou | 62/126 |
| 4,955,206 | 9/1990 | Lang et al. | 62/186 |
| 5,244,674 | 9/1993 | Cadas et al. | 426/524 |
| 5,291,745 | 3/1994 | Hanson | 62/89 |
| 5,555,736 | 9/1996 | Wills et al. | 62/187 |
| 5,673,564 | 10/1997 | Fradin | 62/63 |

OTHER PUBLICATIONS

Brochure entitled "Installations for the Food Industry" By Germos, D 7064 Remshalden/Germany.

*Primary Examiner*—William Doerrler
*Attorney, Agent, or Firm*—Alan D. Kamrath; Peterson, Wicks, Nemer & Kamrath, P.A

[57] ABSTRACT

An apparatus (10) for cooling and tempering bacon slabs supported upon wheeled trucks (24) which can be rolled on the floor (14) inside a cooler (12) includes an evaporator (26) having multiple fans (34) for moving air through refrigerated coils (32) and in the cooler (12). Moisture collecting on the refrigerated coils (32) drops into a drain pan (30) and is drained through pipes (38) outside the cooler (12). The fans (34) are alternately rotated in opposite directions for equal time segments and baffles (40) are provided inside of the cooler (12) to assure uniform air chilling. A controller (46) operates the evaporator (26) so that the air inside of the cooler (12) is cooled to a temperature less than the internal product temperature which is greater than freezing and specifically in the preferred form at a desired temperature differential of 20° F. (11° C.) until an intermediate internal product temperature is reached. Then the evaporator (26) maintains the air temperature inside the cooler (12) below the final internal product temperature until the final internal product temperature is reached when the air is then maintained in the cooler (12) at the final internal product temperature.

15 Claims, 3 Drawing Sheets

APPARATUS AND METHODS FOR COOLING AND TEMPERING PROCESSED FOOD PRODUCTS

BACKGROUND

The present invention generally relates to apparatus and methods for cooling and tempering processed food products and in the most preferred form to apparatus and methods for cooling and tempering bacon slabs or bellies.

In the processing of bacon, bacon slabs are cooked and smoked in a smoke oven for approximately 7½ to 8 hours. After leaving the smoke oven, the bacon slabs have a warm internal temperature in the order of 90° F. (32° C.) or more. In a conventional processing plant, the bacon slabs were sent through a liquid brine chiller until the internal temperature was in the order of 24° F. (−4.5 C.) The bacon slabs would then go into a bacon tempering cooler for a period of 24 to 36 hours so that the bacon slabs were tempered enough to allow pressing into a block form to square the sides and ends and then through a slicer to slice the squared bacon slabs. It can be appreciated that chilling the bacon slabs too fast such that freezing occurs is undesirable as resulting in shattered slices during the slicing operation.

It can then be appreciated that due to the long periods of time to cool and temper the bacon slabs, the smoke oven could be run intermittently to match the capacity of the cooling/tempering phases of the processing line thereby increasing operational as well as capital expenses. Alternately, the capacity of the cooling/tempering phases of the processing line could be increased to match that of the smoke oven which significantly increased capital expenses but which also significantly increased the floor space requirements.

Others have attempted to reduce the time requirements by providing blast chillers, but such prior blast chillers were deficient. Specifically, one chiller has been designed where a water spray is introduced during the chilling operation which is alleged to keep the process uniform. However, actual operation of the chilling operation is very inconsistent and irregular. Additionally, the moisture is allowed to fly around the chilling cabinet and is only eventually removed by going down a floor drain in the chilling cabinet.

Thus, a need exists for apparatus and methods which are able to cool and temper bacon slabs in generally the same amount of time required to cook and smoke the bacon slabs and without freezing the bacon slabs. Thus, it is possible to continuously cook and smoke as well as cool and temper bacon slabs in an oven and in a cooling and tempering apparatus having the same capacity.

SUMMARY

The present invention solves this need and other problems in the field of cooling and tempering processed food products by providing, in the most preferred form, cooling of the air within a cooler at a temperature differential slightly below the internal temperature of the processed food products with the cooled air resulting in heat transfer from the processed food products to the cooled air resulting in a reduced internal temperature and maintaining the air at the temperature differential until the processed food products have an intermediate internal temperature, then maintaining the air in the cooler at the temperature differential at the intermediate internal temperature until the processed food products have a final internal temperature, and then cooling the air within the cooler at the final internal temperature for a time necessary to create tempering of the processed food products. In the most preferred form, moisture is eliminated from the cooler while the air is being cooled inside of the cooler.

In other aspects of the present invention, the air inside of the cooler is alternately moved in opposite directions by alternately rotating fans inside of the cooler for equal time segments of the period of time of operation. In most preferred aspects, baffles are provided in the cooler around which the air must move. The changing of direction of air movement and the baffles assure uniformity of air chilling and thus of the temperature of the processed food products anywhere within the cooler.

Thus, it is an object of the present invention to provide novel apparatus and methods for cooling and tempering processed food products.

It is further an object of the present invention to provide such novel cooling and tempering apparatus and methods for bacon slabs or bellies.

It is further an object of the present invention to provide such novel cooling and tempering apparatus and methods which cool and temper bacon slabs in generally the same amount of time required for cooking and smoking the bacon slabs.

It is further an object of the present invention to provide such novel cooling and tempering apparatus and methods which cool and temper bacon slabs without freezing.

It is further an object of the present invention to provide such novel cooling and tempering apparatus and methods which cool and temper bacon slabs for optimizing yields in the slicing and packaging operations.

It is further an object of the present invention to provide such novel cooling and tempering apparatus and methods which do not need defrosting.

It is further an object of the present invention to provide such novel cooling and tempering apparatus and methods having total control and elimination of condensation.

It is further an object of the present invention to provide such novel cooling and tempering apparatus and methods assuring uniformity of temperature of the processed food products anywhere within the cooler.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
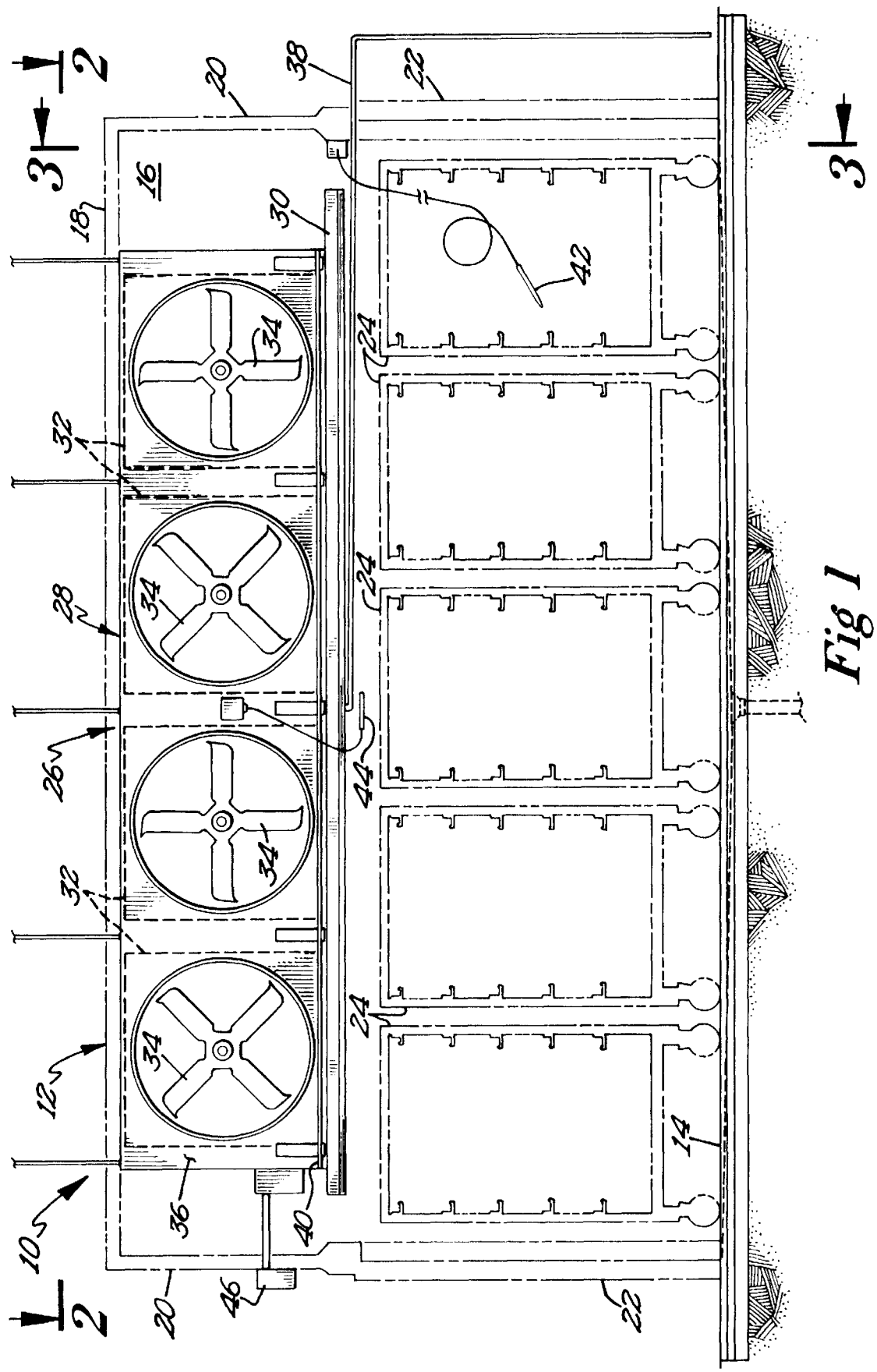
FIG. 1 shows a side view of an apparatus for cooling and tempering bacon slabs or bellies utilizing methods according to the preferred teachings of the present invention, with portions shown in phantom.
Figure 2:
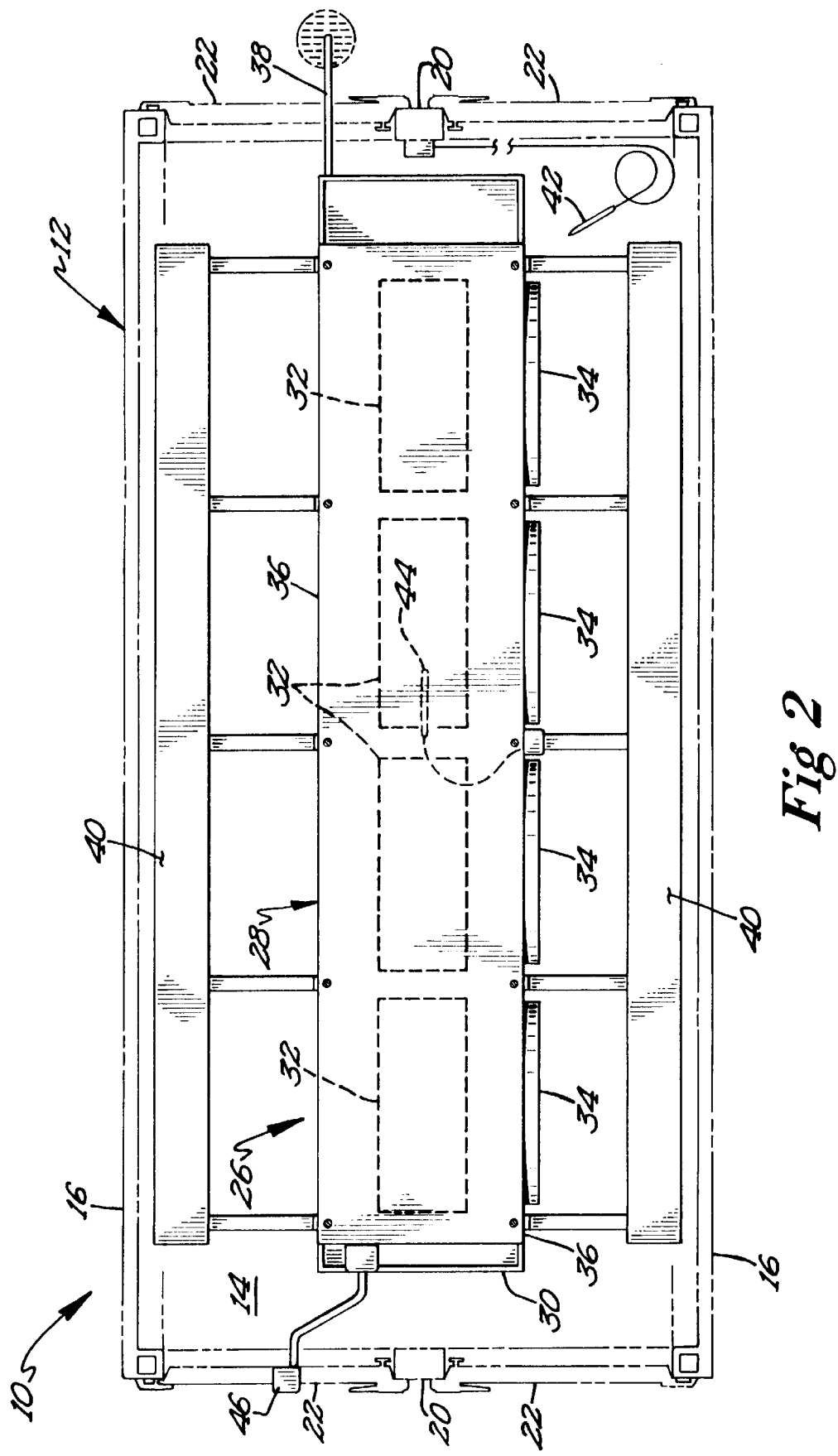
FIG. 2 shows a top view of the apparatus of FIG. 1 according to view line 2—2 of FIG. 1, with portions shown in phantom.
Figure 3:
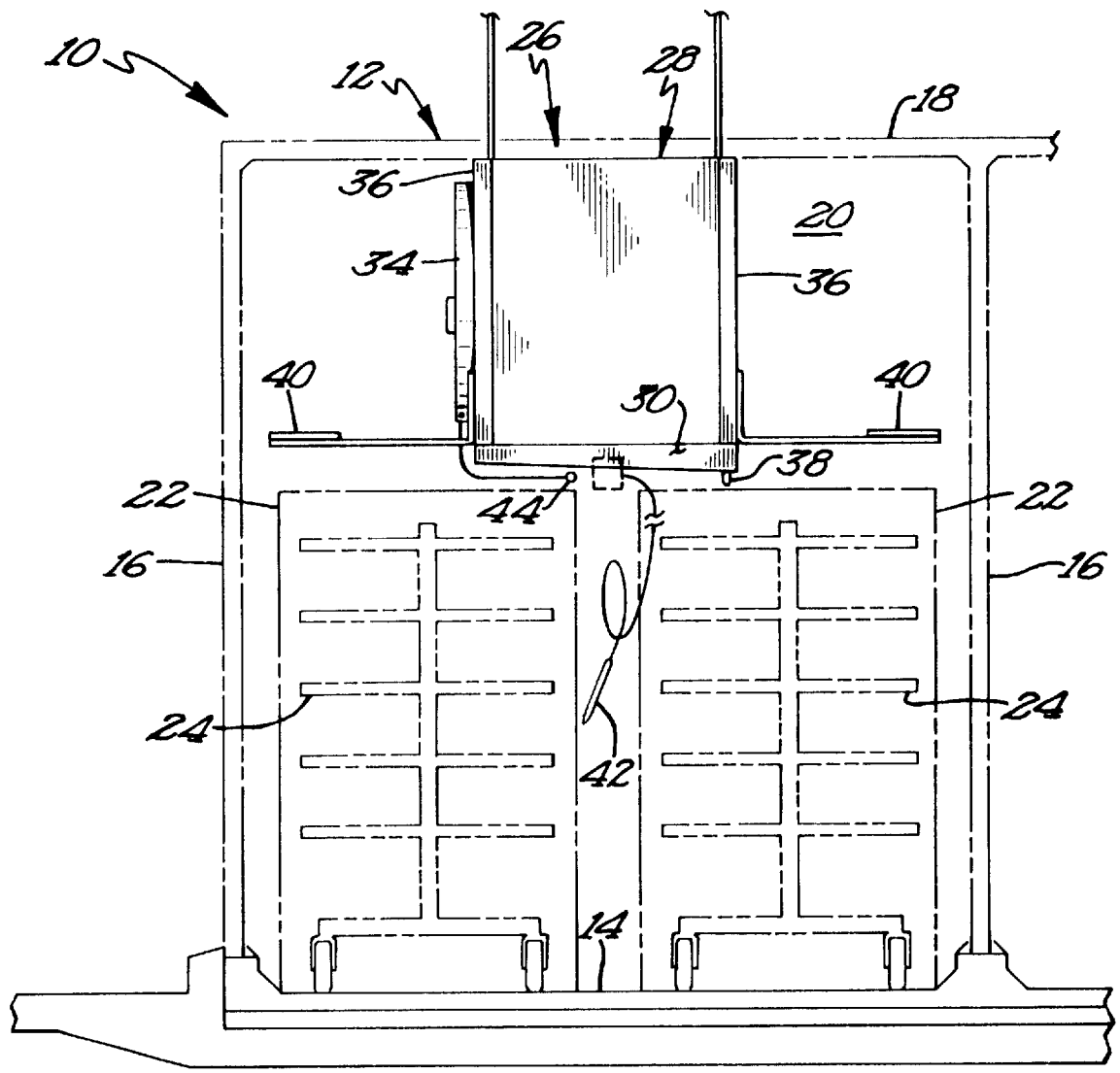
FIG. 3 shows an end view of the apparatus of FIG. 1 according to view line 3—3 of FIG. 1, with portions shown in phantom.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood.

Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "first", "second", "inside", "outer", "upper", "lower", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiment.

DESCRIPTION

An apparatus for cooling and tempering processed food products from a warm temperature usually in the order of 90° F. (32° C. or more to a cooler temperature for United States Department of Agriculture regulations in the order 40° F. of (4.4 C. or less utilizing methods according to the preferred teachings of the present invention is shown in the drawings and generally designated 10. In the most preferred form of the present invention, apparatus 10 is utilized to cool bacon slabs referred to in the trade as bellies to a temperature for maintaining optimum yields in the slicing and packaging operation of the food processing plant and particularly to a temperature in the order of 24° F. (−4.5 C. plus or minus 1° F. (0.5° C.) and to do so in generally the same time that it takes to cook and smoke the bacon slabs or bellies.

In particular, apparatus 10 includes a cooler 12 including a floor 14, first and second side walls 16, a top wall 18, and first and second end walls 20. In the most preferred form, cooler 12 is in the shape of a hollow, rectangular parallelepiped having a length between end walls 20 which is a multiple of the width between side walls 16 and with a height between floor 14 and top 18 generally equal to the width between side walls 16. Floor 14 and walls 16, 18 and 20 are formed by any suitable insulated construction as desired. Access to the interior of cooler 12 can be provided by any suitable doors 22 or the like, with two doors 22 being provided in each of the end walls 20 in the most preferred form.

In the most preferred form, apparatus 10 includes a plurality of wheeled trucks 24 for holding the desired processed food products and in the most preferred form are in the form of smoke trucks 24 in which bacon slabs or bellies are cooked and smoked. Specifically, in the preferred form, each truck 24 holds approximately 550 pounds (250 kg) of bacon slabs or bellies. The cooking and smoking time in the processing of bacon slabs or bellies in trucks 24 is approximately 7½ . In the most preferred form, cooler 12 holds ten trucks arranged in two rows of five trucks 24 between end walls 20.

Cooler 12 generally includes an evaporator 26 located in the interior and in the most preferred form hung or supported from top wall 18 above trucks 24 and centered between side walls 16. In the most preferred form, evaporator 26 includes a housing 28 in the shape of a hollow, rectangular parallelepiped. The bottom of housing 28 is formed by a drain pan 30. Refrigerated coils 32 of a conventional design are positioned in the interior of housing 28. Air is circulated through housing 28 and specifically past coils 32 by fans 34 mounted for rotation about horizontal axes in vertical openings formed in one of sides 36 of housing 28. According to the teachings of the present invention, fans 34 can be alternately rotated at constant speeds in either clockwise or counterclockwise directions in differing time segments. It can be appreciated that moisture will collect on coils 32 as droplets and will drop into drain pan 30. Water dropping into drain pan 30 will drain from drain pan 30 through any suitable pipe 38 extending through cooler 12 to a floor or any suitable drain that is located outside of cooler 12. Thus, it can be appreciated that moisture is eliminated from the chilling process according to the teachings of the present invention. In the most preferred form, four fans 34 are provided each creating about 44,000 cubic feet (1,250,000 liters) per minute of air flow. The other of sides 36 is open while the ends of housing 28 are closed. Coils 32 are sized to provide 16 tons of refrigeration at a temperature difference of 8° F. (4.5° C.) and include fins in a conventional manner to increase area of heat transfer.

In the most preferred form, baffles 40 are provided in cooler 12 intermediate evaporator 26 and trucks 24 and in the most preferred form are formed by elongated plates extending parallel to top wall 18 at a height generally equal to that of drain pan 30 and spaced from side walls 16 and sides 36. In the most preferred form, baffles 40 have a width equal to one-fourth of the spacing of side 36 from side wall 16 and is located about double the spacing from side 36 than from side wall 16. It can be appreciated that baffles 40 can take other desired forms and placements for directing air inside of cooler 12.

Apparatus 10 further includes suitable provisions 42 for sensing the internal temperature of the processed food products and in the preferred form a temperature probe. In the most preferred form, probe 42 is inserted in one of the bacon slabs or bellies of a perceived average or larger size in one of trucks 24 located inside cooler 12. Additionally, cooler 12 includes a suitable temperature sensor 44 for sensing the temperature of the interior of cooler 12. Further, a suitable controller 46 in the preferred form of a programmable microprocessor receives input signals from probe 42 and sensor 44 and controls operation of evaporator 26. In this regard, probe 42 and sensor 44 are suitably electrically connected to controller 46.

Now that the basic construction of apparatus 10 according to the preferred teachings of the present invention has been explained, a method of operation of apparatus 10 can be set forth and appreciated. Specifically, processed food products are introduced into the interior of cooler 12. Particularly and for the sake of explanation, it will be assumed that ten trucks 24 of bacon slabs or bellies have completed the cooking and smoking process steps. The typical initial internal temperature of the bacon slabs or bellies on trucks 24 introduced into cooler 12 is in the order of 90° F. (32° C.) or higher. The trucks 24 are removed from the cooking and smoking process portion of the food processing line and rolled through doors 22 on floor 14 and into the interior of cooler 12. In the most preferred form of the present invention, trucks 24 from prior operation of apparatus 10 can be removed through doors 22 from one end wall 20 as trucks 24 for the next operation of apparatus 10 are being inserted through doors 22 at the other end wall 20.

After trucks 24 are located in the interior of cooler 12 and doors 22 are closed, evaporator 26 is operated to cool the air within the interior of cooler 12. In particular, refrigerant is passed through coils 32 so that the air inside of cooler 12 is cooled at a temperature differential slightly below the internal temperature of the processed food product and in the most preferred form is held 20° F. (11° C.) below the internal temperature of the bacon slabs or bellies in trucks 24. It can be appreciated that since the product internal temperature is greater than the air temperature inside of cooler 12, heat transfer occurs from the bacon slabs or bellies to the cooled air inside of cooler 12 resulting in a reduction of the internal temperature of the bacon slabs or bellies. As the internal temperature of the bacon slabs or bellies drops, the air temperature inside of cooler 12 is also reduced to maintain the desired temperature differential.

It should be appreciated that as the temperature of the bacon slabs or bellies drops, moisture will be released in the form of vapor from the bacon slabs or bellies. This moisture then condenses on coils 32 where it drops into drain pan 30 and drains from cooler 12 through pipe 38. Thus, moisture is thereby eliminated in the chilling process according to the teachings of the present invention. In actual practice, the majority of moisture that is eliminated occurs within the first couple of hours of operation of apparatus 10. It should be appreciated that since the processed food products are introduced at a warm temperature and the air temperature inside of cooler 12 is maintained at a temperature differential of 20° F. (11° C.) and the majority of moisture from the processed food product is eliminated while the air temperature in cooler 12 and the internal product temperature is above freezing, problems of moisture freezing on coils 32 and the defrosting thereof are not encountered utilizing apparatus 10 of the present invention.

Operation of apparatus 10 continues in this manner for a first portion of time until the temperature of the air inside of cooler 12 reaches 18° F. (−7.8° C. or in other words when the internal temperature of the bacon slabs or bellies is in the order of 38° F. (3.3° C.). In actual practice, operation of apparatus 10 in this first portion of time to reach the 18° F. (−7.8° C.) temperature takes in the range of approximately 3 to 4 hours, depending upon the size of the bacon slabs or bellies. At this point in the most preferred form, controller 46 controls operation of evaporator 26 so that the air temperature inside of cooler 12 is maintained at the temperature differential at the intermediate internal temperature which in the preferred form is 18° F. (−7.8° C.) until the internal temperature of the bacon slabs or bellies reaches its desired final level which in the preferred form is in the order of 24° F. (−4.5° C.). In actual practice, operation of apparatus 10 in this subportion of time for the internal product temperature to decrease from 38° F. (3.3° C.) to 24° F. (−4.5° C.) takes in the order of approximately 4 hours. When the internal temperature of the bacon slabs or bellies reaches its desired final level, controller 46 controls operation of evaporator 26 so that the air temperature inside of cooler 12 is generally equal to the desired final internal temperature of the bacon slabs or bellies. This last subportion of time of operation of apparatus 10 is to create tempering time to achieve firmness for the pressing operation before slicing of the bacon slabs or bellies. The actual time for this last period of operation of apparatus 10 in this subportion of time will vary slightly depending upon the size of the bacon slabs or bellies but typically takes in the range of approximately 1 hour.

In the most preferred form of the present invention, fans 34 are operated to alternately rotate in one direction such as clockwise and then to rotate in the opposite direction such as counterclockwise for equal time segments, such as 30 minutes, with the period of time of full operation of evaporator 26 in the preferred form of 8 to 10 hours being a multiple of the time segments in which fans 34 are alternately rotated. The reversal of rotation of fans 34 and the use of baffles 40 according to the preferred teachings of the present invention assure uniformity of air temperature and chilling inside of cooler 12. This is important to insure that product anywhere in any of trucks 24 has the final internal temperature within a tolerance of plus or minus 2° F. (1.1° C.).

It can then be appreciated that apparatus 10 according to the preferred teachings of the present invention is able to cool bacon slabs or bellies having an initial internal temperature of approximately 90° F. (32° C.) or more to a final internal temperature in the order of 24° F. (−4.5° C.) and also to maintain the desired internal temperature for a sufficient time to optimize yields in the slicing and packaging operation and within a total time of 8 to 10 hours and specifically for approximately the same amount of time as it takes to cook and smoke the bacon slabs or bellies.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. Method for cooling and tempering processed food products to a final internal temperature in a period of time comprising the steps of: introducing the processed food products into a cooler, with the introduced processed food products having an initial internal temperature greater than the final internal temperature; cooling the air within the cooler at a temperature differential slightly below the internal temperature of the processed food products with the cooled air resulting in heat transfer from the processed food products to the cooled air resulting in a reduced internal temperature; maintaining the air at the temperature differential until the processed food products have an intermediate internal temperature; then maintaining the air in the cooler at the temperature differential at the intermediate internal temperature until the processed food products have the final internal temperature; and then cooling the air within the cooler at the final internal temperature for a time necessary to create tempering of the processed food products.

2. The method of claim 1 wherein the cooling steps include the step of eliminating moisture from the cooler.

3. The method of claim 2 wherein the intermediate internal temperature is greater than the final internal temperature.

4. The method of claim 3 wherein the cooling steps include the step of moving the air around baffles in the cooler.

5. The method of claim 4 wherein the moving step comprises the step of alternately moving the air in the cooler in a first direction and an opposite direction for equal time segments, with the period of time being a multiple of the time segments.

6. The method of claim 3 wherein the cooling steps include the step of alternately moving the air in the cooler in a first direction and an opposite direction for equal time segments, with the period of time being a multiple of the time segments.

7. The method of claim 6 wherein the cooling steps include the step of moving the air past a refrigerated coil; and wherein the eliminating step comprises the steps of: collecting moisture as droplets on the refrigerated coil, dropping the droplets into a drain pan located below the refrigerated coil, and draining the droplets dropping into the drain pan to outside the cooler.

8. The method of claim 3 wherein the cooling steps include the step of moving the air past a refrigerated coil; and wherein the eliminating step comprises the steps of:

collecting moisture as droplets on the refrigerated coil, dropping the droplets into a drain pan located below the refrigerated coil, and draining the droplets dropping into the drain pan to outside the cooler.

9. The method of claim 3 wherein the step of cooling the air at the temperature differential comprises the step of cooling the air at a temperature in the order of 20° F. (11° C.) less than the internal temperature of the processed food products.

10. The method of claim 9 wherein the step of cooling the air at the final internal temperature comprises the step of cooling the air at a temperature in the order of 24° F. (−4.5° C.).

11. The method of claim 10 wherein the step of maintaining the air at the temperature differential at the intermediate internal temperature comprises the step of maintaining the air at a temperature in the order of 18° F. (−7.8° C.).

12. Method for cooling and tempering processed food products to a final internal temperature in a period of time comprising the steps of: introducing the processed food products into a cooler, with the introduced processed food products having an initial internal temperature greater than the final internal temperature; alternately rotating at least one fan about an axis in a first direction and an opposite direction for equal time segments for moving the air in the cooler, with the period of time being a multiple of the time segments; and cooling the air within the cooler for a first portion of time to a temperature less than the internal temperature which is greater than a temperature for freezing the processed food products, with the first portion of time being less than the period of time; and cooling the air within the cooler for a second portion of time after the first portion of time to a temperature less than or equal to the final internal temperature, with the same of the first and second portions of time being equal to the period of time.

13. The method of claim 12 further comprising the steps of: eliminating moisture from within the cooler while the air is being cooled.

14. The method of claim 13 wherein the step of cooling the air within the second portion of time comprises the steps of cooling the air within the cooler for a first subportion of time to a temperature less than the final internal temperature and then cooling the air within the cooler after the first subportion of time to a temperature equal to the final internal temperature.

15. The method of claim 14 further comprising the step of moving the air around baffles in the cooler.

* * * * *

UNITED STATES PATENT AND TRADEMARK OFFICE
CERTIFICATE OF CORRECTION

PATENT NO. : 5,816,053
DATED : October 6, 1998
INVENTOR(S) : Larry A. Huether

It is certified that error appears in the above-identified patent and that said Letters Patent is hereby corrected as shown below:

Column 3, line 19, cancel "C." and substitute therefor --C.)--.

Column 3, line 22, cancel "C." and substitute therefor --C.)--.

Column 3, line 28, cancel "C." and substitute therefor --C.)--.

Column 3, line 53, after "7½" insert --hours--.

Column 5, line 27, cancel "C." and substitute therefor --C.)--.

Column 8, line 9, cancel "same" and substitute therefor --sum--.

Signed and Sealed this

Twenty-ninth Day of December, 1998

*Attest:*

BRUCE LEHMAN

*Attesting Officer*      *Commissioner of Patents and Trademarks*